Figure 1:
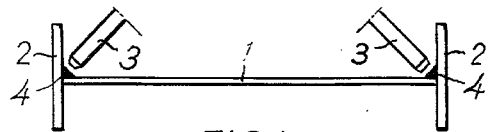

3,199,174
METHOD OF ELIMINATING BUCKLING DEFORMATION OF BEAMS

Bengt Erik Nilsson, Saltsjobaden, and Erik David Arvidsson, Goteborg, Sweden, assignors to AB Bröderna Hedlund, Stockholm, Sweden, a corporation of Sweden
Filed Oct. 26, 1962, Ser. No. 233,342
Claims priority, application Sweden, Oct. 10, 1962, 10,871/62
7 Claims. (Cl. 29—155)

In the art of building, beams with parallel sides and various shapes of the end-face are in extensive use. Such beams are usually made of steel and have previously generally been produced by rolling. This process of manufacture has to some degree decided how to shape the cross-section of the beams, because technical reasons associated with rolling limit the possibilities to vary said shape. Examples of such beams are I-, L-, T-, U-, and Z-shaped beams, where the cross-section almost has the shape of the corresponding letter.

In order to obtain light beams, having large bending and buckling strengths, it is often desired to use beams with other shapes than those attainable by rolling. Especially, this is true of I-shaped beams, which for reasons just mentioned, should be manufactured with thin webs of a rather large height or breadth and to a required extent also with rather wide flanges. Such profiles are not suitable to be manufactured by rolling. On the contrary, these beams have had to be manufactured by joining different single elements in the form of sheet metal and flat bars, which constitute the webs and flanges, respectively, of the manufactured beam. In case of steel beams the elements may be joined by welding e.g. arc welding. The beams may suitably be produced in machines, through which the different construction members are transferred with due regard to keeping them in the desired mutual positions, whereby the members are continuously joined, e.g. by fusion welding, when passing a welding device.

Alternatively, the beams can be produced by rolling together their different main construction members, i.e. the flanges and the webs, whereby the flange is in advance furnished with a longitudinal slot which is engaged by the bulge-shaped rim of the web.

Beams manufactured in said manner with rather high and thin webs with regard to their weight are capable of withstanding rather large moments of flexure, while their section modulus is rather high. In this case, however, another problem connected to the physical properties presents itself, viz., the risk of buckling of the beam web under the influence of different exterior loads. According to the classical theory of elasticity, there is at said occasion of loading, a critical amount of stress, that cannot be exceeded without the occurrence of buckling. However, investigations have shown that the strength of beams with thin and high webs against buckling is larger than the theoretical calculations indicate. On the basis of these established facts, it has consequently been possible to form beams having rather large height and thin webs, which with low dead weight have proved to take essentially larger loads than what has earlier been considered possible.

The present invention relates to a method of manufacturing beams of the type referred to above, and of I-section, but is also suitable for high and thin beams otherwise formed. As mentioned above, these beams are suitably produced by welding together the construction members of the beam in machines with certain construction features. These machines are suitably so made that the members of the beam are guided by rollers, which at the same time fix the members in their position in relation to each other and feed them through the machine past stationary welding devices.

Figure 2:
Figure 3:
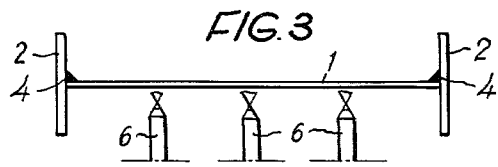
Figure 4:
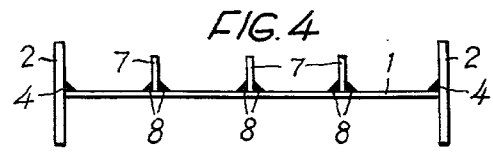

The method of the invention will be described by way of example with reference to the accompanying drawing, in which FIGURE 1 shows an end view of an I-shaped beam, the beam members being shown in the positions they actually occupy at the time of welding, FIGURE 2 is an end view like that shown in FIGURE 1 but after welding, FIGURE 3 is a similar end view illustrating the application of heat, according to one embodiment of the invention, FIGURE 4 is a similar end view illustrating a further embodiment, and FIGURE 5 a similar view of a modification.

The illustrated beam is composed of a uniplanar web of sheet metal such as steel, which has its longitudinal edges butting against two flat strips of similar material for the flanges 2, 2 having a simple rectangular cross section. The web 1 is fed through the machine in a horizontal position while the flange strips are disposed vertically. The joining by welding is performed with the aid of a continuously operating welding device 3. The welding may be effected e.g. by powder welding in an electrical arc, whereby the fillet weld 4 is placed between the web and the flange. After one side of the beam has been welded, the beam is turned over and the corresponding welding procedure is performed on its other side. The supplied electrode as well as those sections of the web and the flange which surround the weld are heated during the welding operation. When cooling, these sections are contracted and induce in that way a stress, which is characterized by tensile stresses in the weld and the nearest section of the web and the flanges and further by compressive stresses in the other parts of them. These compressive stresses provoke a tendency of buckling, especially of the web. In the present case characterized of rather thin and high webs and welds with comparatively large cross section and accordingly stronger heating, an annoying buckling 5 of the web may occur as indicated with dotted lines in FIGURE 2. Desirably, such a buckling of the produced beam should be avoided.

When the above described general procedure is carried into practice for the actual type of beams, the invention particularly aims at a method which eliminates the buckling effect on the web material. The method is more completely described below with reference to the figures.

The beam shown in FIGURE 3 is composed of a web of sheet metal and two flange strips 2, 2. These members are joined by welding, as described above with reference to FIGURE 1. Thus, fillet joints 4, 4 are applied simultaneously along each edge of the web sheet and the corresponding flange strip. During this welding operation the web material is exposed to heating with the aid of a number of heating sources, consisting of acetylene burners or the like, placed in line and between the welding spots. FIGURE 3 shows three heating sources. Their number and positions are adapted to the dimensions of the web and the degree of heating caused by the welding operation. Due to the simultaneous heating of the edges of the web by the welding and its interjacent areas by the heating sources, it is possible to equalize the deformation setting in at the cooling of the web so that no buckling appears. In the same manner one can equalize the deformation set in on the flanges by heating their edges.

An alternate method of avoiding buckling of the web is shown in FIGURE 4. Simultaneously with the application of the welds 4, 4 between the web sheet and the flange strips, a number of flat strips 7 of metal, preferably iron, are welded with the aid of fillet joints to the web sheet at right angles. The flat strips 7 are fed through the welding machine and are kept in position relative to the web during the welding operation with the aid of guide rollers in the same manner as described above in connection with FIGURE 1. The welding of the flat strips on the web is suitably performed by arc-welding with powder in the same manner as the welding of the web to the flanges. The presented welding of the flat strips 7 produces partly a heating of the central part of the web so as to equalize the deformation setting in during the cooling period after the welding procedure, and partly to stiffen the web. This stiffening action has the purpose partly to reduce eventual buckling at the manufacture of the beam and partly to strengthen the web against the tendency of buckling caused by external forces. The last illustrated method of avoiding that buckling of the web which may appear from various reasons is advantageous from a manufacturing point of view, since simultaneously with the welding of the members of the beam, the double task of equalizing deformations setting in by heating action and providing the web with stiffening reinforcements is solved. With reference to FIG. 4, the reinforcement members 7 may alternatively be applied also to the opposite side of the web sheet, in which case this is effected in connection with the welding of the fillet joints between the web sheet and the flange strips on the opposite side of the beam. In the latter case, a beam is obtained, the section of which is symmetrical with regard to the central plane of the web and which is furnished with stiffening strips, extending from each side of the web.

Figure 5:
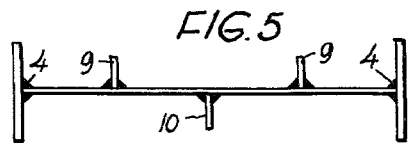

FIGURE 5 illustrates a further embodiment. In this case two stiffening strips 9, 9 on the one side of the web are welded in connection with the welding of the fillet joints 4, 4. At the welding of the other side of the beam, a stiffening strip 10 is attached to the central part of the web.

The position of the stiffening strips, according to the presented principle, may vary in accordance with the degree of stiffening and of the deformation by the heating, which are obtained as the various members of the beam are being welded to one another.

What is claimed is:

1. A method of manufacturing beams, comprising the steps of feeding a relatively thin and broad web material of sheet metal such as steel and metallic flange strips through a welding machine past stationary welding devices therein while guiding the flange strips in engagement with the longitudinal edges of said web material and welding said flange strips to said longitudinal edges by said welding devices, and supplying heat to portions of the web material located between said welding devices and spaced from the points of the said edges in which welding is taking place, said heat being supplied in a quantity sufficient to prevent buckling of said web material.

2. A method as claimed in claim 1 and further characterized by the steps of feeding flat strips in engagement with intermediate portions of the web material parallel with the longitudinal edges thereof and welding said flat strips by stationary welding devices simultaneously with the welding of the flange strips to the longitudinal edges of the web material utilizing the heat from the welding of said flat strips for heating intermediate portions of the web material to avoid buckling thereof.

3. A method of making a beam of the type that comprises an elongated flat web and flanges secured along both longitudinal side edges of the web, which comprises welding flanges to opposite longitudinal edges of an elongated flat web and simultaneously applying heat to portions of the web between and spaced from the longitudinal side edges of the web to which the flanges are being welded, said heat being applied in a quantity sufficient to prevent buckling of the web.

4. A method as claimed in claim 3, said applying of heat being effected by directing hydrocarbon fuel flames against portions of the web spaced between the flanges.

5. A method as claimed in claim 3, said applying of heat being effected by welding metallic strips to portions of the web spaced between said flanges with said strips being disposed parallel to said flanges.

6. A method as claimed in claim 5, said metallic strips being applied to one side only of the web.

7. A method as claimed in claim 5, said metallic strips being applied to both sides of the web.

References Cited by the Examiner
UNITED STATES PATENTS

| | | | |
|---|---|---|---|
| 2,172,806 | 9/39 | Probeck | 29—155 |
| 2,376,574 | 5/45 | Collins | 29—155 |
| 2,844,864 | 7/58 | Schilberg | 29—155 |

WHITMORE A. WILTZ, *Primary Examiner.*

THOMAS H. EAGER, *Examiner.*